US005745330A

United States Patent [19]

Yang

[11] Patent Number: 5,745,330

[45] Date of Patent: Apr. 28, 1998

[54] SURGE ABSORBER

[76] Inventor: Binglin Yang, F201, Syueiso, 1-14-10 Kamiochiai, Shinjuku-ku, Tokyo, Japan

[21] Appl. No.: 742,267

[22] Filed: Oct. 31, 1996

Related U.S. Application Data

[63] Continuation of Ser. No. 378,969, Jan. 26, 1995, abandoned.

[30] Foreign Application Priority Data

Feb. 5, 1994 [CH] Switzerland ........................ 94202711.6

[51] Int. Cl.$^{6}$ ........................................................ H02H 7/10

[52] U.S. Cl. ............................ 361/120; 361/119; 361/127

[58] Field of Search ........................... 338/20, 21; 337/28, 337/34; 361/111, 119, 120, 117, 127

[56] References Cited

U.S. PATENT DOCUMENTS 5,436,608 7/1995 Togura .................................... 361/117

5,450,274 9/1995 Wiesinger et al. ...................... 361/130

*Primary Examiner*—Jeffrey A. Gaffin

*Assistant Examiner*—Sally C. Medley

*Attorney, Agent, or Firm*—Ladas & Parry

[57] ABSTRACT

A surge absorber comprises a housing, electrode bars, leads and an air chamber. A core constituted by layers of conductive and non-conductive material is provided between the electrode bars. The air chamber is filled with inert gases. The materials of the conductive and non-conductive layers can be arbitrarily laminated to form an integrated body, and the shape of the core may be multiple stepped tower-like. The working voltage is 80 V–3668 volts, and the discharging light emitting time is less than $10^{-6}$ sec.

8 Claims, 1 Drawing Sheet

FIG. 1
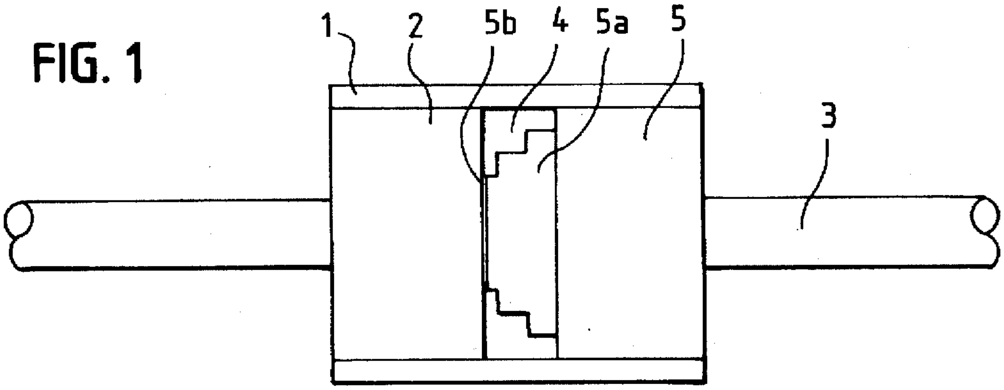
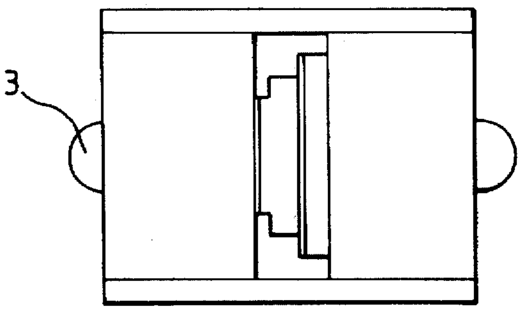
FIG. 2
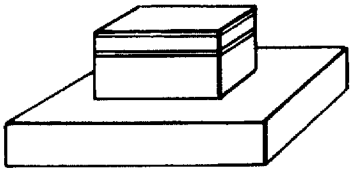
FIG. 4
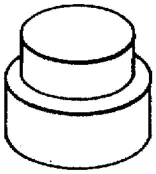
FIG. 10
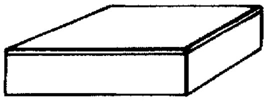
FIG. 3
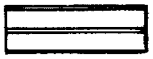
FIG. 8
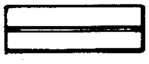
FIG. 5
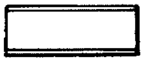
FIG. 6
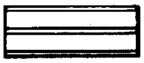
FIG. 7
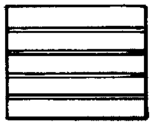
FIG. 9

SURGE ABSORBER

This is a continuation of application Ser. No. 08/378,969 filed on Jan. 26, 1995 now abandoned.

FIELD OF THE INVENTION

The present invention relates to an electronic device; and, more particularly, to a surge absorber.

BACKGROUND OF THE INVENTION

Stray waves, noise or electrostatic disturbances are inveterate foes to modern electronic apparatus, among various surges, even the intrusion of high voltage pulse waves may cause erroneous operations of semiconductor devices of the electronic apparatus, or even causing damages of the semiconductors and the apparatus themselves. The above-mentioned technical problems can be solved by the use of surge absorbers.

The known surge absorber is constituted by a structure of a conductive film partitioned by micro grooves. The switching voltage of such surge absorber can not be selected freely, therefore the application of which is severely limited. U.S. Pat. No. 4,727,350 has disclosed a surge absorber comprising a cylindrical tube core covered with a conductive film having intersecting micro grooves, and sealed in an outer glass envelope. The application field of the absorbers of such structure can be extended. However, it is relatively difficult to fabricate such structure, and the volume of which is bulky, especially, the operating speed is slow and the stability and durability are poor, thereby, it can not meet the practical requirements.

SUMMARY OF THE INVENTION

In order to overcome the drawbacks of the prior art, it is, therefore, an object of the present invention to provide a novel surge absorber having simple structure, small size, better performance and quick response.

The object of the present invention is achieved by the following technical scheme:

The present invention relates to a surge absorber comprising a housing, electrode bars, leads or terminals connected to the electrode bars, and an air chamber, characterized in that a tube core constituted by a layer of conductive material and a layer of non-conductive material is provided between said electrode bars, and the gases injected into said air chamber includes argon, or mixture of argon with one or more other inert gases selected from the group of helium, neon, krypton, xenon, and radon, or $SF_6$, wherein the working voltage (spark-over voltage) of the absorber is from 80 volts to 3600 volts or higher, and the surge absorbing time is less than 0.000001 sec ($10^{-6}$ sec). The tube core according to the present invention can be constituted by at least one layer of said conductive material and at least one layer of non-conductive material. Furthermore, the tube core of the present invention can be an integrate body constituted by sequentially laminating a plurality of layers of conductive material and non-conductive material, or an integrated body constituted by non-sequentially laminating a plurality of layers of conductive material and non-conductive material.

The tube core described above can be cubic, cylindrical, and preferably stepped or tower-like in shape.

In the surge absorber of the present invention, said tube core also can be an irregular tube core consisting of at least two mutually overlapped tube cores constituted by laminating a layer of conductive material and a layer of non-conductive material.

The material constituting the non-conductive layer of said tube core is selected from the group of ceramic, or glass, or mixture of ceramic and glass. The material of said conductive layer is selected from the group of mono-crystalline silicon (P-type, N-type or mixed N- and P-type), hard metal such as tungsten, copper and aluminium, or metallic alloy such as stainless steel and duralumin.

The housing of the surge absorber of the present invention can be an envelope sealed with glass or plastic.

The content of argon in said mixture of gases is equal to or greater than 3%.

Said absorber can be widely used in highly complicated electronic technical circuits, such as those used as important elements for resetting in electronic computers of large memory capacity and high operation speed. The effects on the electronic apparatus due to surge waves generated by the frequent on/off blinking of the display of computer or other electronic apparatus can be completely resolved.

In addition, it can also be used in apparatus connected by telephone lines, such as telephone set, radio, facsimile, modem and program controlled telephone exchanger; in apparatus connected to antenna and signal lines such as amplifier, tape recorder, vehicle radio, radio transceiver, signal lines of sensors, and apparatus necessary for electrostatic prevention such as display and monitor, as well as domestic appliances and computer controlled electronic products. It also functions as overvoltage protection. It is an efficient electronic device for resolving the hazardous results caused by static electricity.

BRIEF DESCRIPTION OF THE DRAWINGS

FIG. 1 is a structural diagram of a surge absorber according to an embodiment of the present invention;

FIG. 2 is a structural diagram of a surge absorber according to another embodiment of the present invention;

FIG. 3 is a structural diagram of the tube core of the surge absorber of the present invention;

FIG. 4 is another structural diagram of the tube core of the surge absorber of the present invention;

FIG. 5 is yet another structural diagram of the tube core of the surge absorber of the present invention;

FIG. 6 is still another structural diagram of the tube core of the surge absorber of the present invention;

FIG. 7 is still another structural diagram of the tube core of the surge absorber of the present invention;

FIG. 8 is still another structural diagram of the tube core of the surge absorber of the present invention; and FIG. 9 (and FIG. 10) is yet still another structural diagram of the tube core of the surge absorber of the present invention.

DETAILED DESCRIPTION OF THE PREFERRED EMBODIMENTS

The present invention will now be described with reference to the accompanying drawings and the embodiments.

Referring to FIG. 1, a surge absorber of the present invention comprises a housing which is normally a glass envelope 1, electrode bars 2, such as Dumet electrode bars, two leads 3 connected to the electrode bars, or two leadless terminals 3 (referring to FIG. 2); a tube core 5 positioned between said electrode bars and connected to the end of one of said electrode bars, the tube core can be cubic or cylindrical (see FIG. 10) and preferably a stepped structure having a relatively wide lower step and a relatively narrow upper step, or it can be of a tower-like structure. The lower layer of the tube core is a layer of conductive material **5*a*, such as tungsten, the upper layer of the tube core is a layer of non-conductive material 5*b*, such as ceramic. In other words, a layer of non-conductive material 5*b* is disposed on the top surface of the tower-like conductive material 5*a*. In the sealed housing, an air chamber 4** filled with a gas, such as an inert gas and preferably argon, is formed between the two electrode bars.

The present invention is a diode capable of efficiently absorbing high voltage spray waves and surge pulses, which is manufactured by the use of the principle of converting electrical energy into photo energy to consume and absorb electrical energy. The reactive characteristic of this absorber is inherently different from that of the LED. The light emission of this absorber is instantaneous, while the light emitting phenomenon of the light emitting diode (LED) or discharge tube gradually turns weak from high intensity to extinction.

The inventor discovered that the larger the surface area of the tube core and the volume of the air chamber, the higher the speed of electro-photo energy conversion. The tube core of the surge absorber of the present invention employs tube core structures specific to the present invention, such as stepped or tower-like structure, and irregular overlapped structure, which can be a connection of a plurality of cubes or cylinders of stepwise reduced sizes. Such structures greatly increase the contact area of the conductive material layer **5*a*** with the gas inside the air chamber, thereby the speed of the conversion from electric to photo energy can be increased. This conversion speed or surge absorbing speed is directly related to the technical performance of the absorber of the present invention.

In comparison with the surge absorber described in the above-mentioned U.S. Pat. No. 4,727,350, the absorber of the present invention has the advantages of a long working life and greatly increased durability, such that the failure rate of the application in electrical apparatus is greatly reduced.

In the present invention, the constitution of the tube core with a layer of conductive material and a layer of non-conductive material (see FIG. 3) is not a unique and limiting implementation. The tube core of the present invention can be an arbitrary laminated multilayer structure of at least one layer of conductive material and at least one layer of non-conductive material. For example, these layers can be laminated in the order of: non-conductive layer (black color marked), conductive layer, non-conductive layer and conductive layer (refer to the stepped structure shown in FIG. 4); or conductive layer, non-conductive layer and conductive layer (see FIG. 5); or non-conductive layer, conductive layer and non-conductive layer (see FIG. 6); or non-conductive, conductive, non-conductive, conductive and non-conductive layers (see FIG. 7); or non-conductive, conductive, non-conductive, and conductive layers (see FIG. 8); or the structure shown in FIG. 9, etc. It can be seen that both the order of lamination and the number of the laminated layers are not limited.

The shape of the laminated tube core described above can be cubic, cylindrical, convex, stepped structure, or tower-like structure.

In the present invention, the tube core can be prepared by utilizing the thin film process or the thick film process known to those skilled in the art.

Generally, the thickness of the layers of conductive and non-conductive materials in the tube core is not limited, and can be determined in accordance with the working voltage, surge current capacity and required working life, sometimes, the thickness of the conductive layer can be greater than that of the non-conductive layer, and sometimes, vice versa.

As described above, in the surge absorber of the present invention, said tube core can be made of an irregular shaped tube core by arbitrary overlapping two or more tube cores constituted by a layer of conductive material and a layer of non-conductive material. This overlapping is fulfilled in the manufacture of the surge absorber of the present invention, in practice, at least two chips each constituted by a layer of conductive material and a layer of non-conductive material are selected to be placed into the tube housing such that these two or more chips are irregularly contacted with each other, thereby forming a tube core without fixed shape, but the surfaces of both the conductive and non-conductive layers of the finally obtained tube core should be normal to the axis between the two electrode bars.

EXAMPLE 1

Glass diode envelope of internationally common DO-34 type, with inner diameter of about 0.66 mm, was selected, and the tube core of the present invention shown in FIG. 3 was employed, the size of which was adaptive to the inner diameter of the DO-34 type, i.e. the diameter of the bottom of the tube core or the diagonal of the quadrilateral was about 0.66 mm, the conductive layer material on the bottom of the tube core was monocrystalline silicon of 0.20 mm in thickness, and the top layer was ceramic of 0.04 mm in thickness, the surge absorber (called tube 1) was sealed by sintering in the state of filled with argon, which was similar to the method for preparation of common glass sealed diode known to those skilled in the art.

The air chamber was filled with pure argon.

EXAMPLE 2

Glass diode envelope of internationally common DO-35 type, with inner diameter of about 0.76 mm, was selected. A surge absorber was manufactured there from with the method similar to that of Example 1, except that the shape of the tube core inside this surge absorber was the structure shown in FIG. 1, the materials of the conductive and non-conductive layers were tungsten and glass, respectively. The resultant surge absorber was called tube 2. The thickness of the conductive layer of this absorber was 0.28 mm, and that of the non-conductive layer was 0.08 mm.

The air chamber was filled with a mixture of argon and nitrogen, and the content of argon was 30%.

EXAMPLE 3

A surge absorber was manufactured with the same method as that of Example 1, except that the shape of the tube core of this surge absorber was the structure shown in FIG. 8, the materials of the conductive and non-conductive layers were tungsten and ceramic, respectively. The surge absorber manufactured was called tube 3. The tube core of this absorber was constituted by laminating two structures as shown in FIG. 3.

The air chamber was filled with a mixture of argon and helium, and the content of argon was 70%.

EXAMPLE 4

Glass diode envelope of common DO-41 type was selected, the inner diameter of which was 1.53 mm and the diameter of the leads was 0.5 mm (Φ0.5 mm). A surge absorber was manufactured with the same method as that of Example 1, except that the shape of the tube core inside this surge absorber was the structure shown in FIG. 5, the materials of the conductive and non-conductive layers were monocrystalline silicon and ceramic, respectively. The surge absorber thus obtained was called tube 4. The thickness of the conductive layer of this surge absorber was 0.20 mm, and that of the non-conductive layer was 0.28 mm. The size of the tube core of this absorber was 1.0×1.0 mm.

The air chamber was filled with a mixture of argon and radon, and the content of argon was 90%.

EXAMPLE 5

Glass diode envelope of external diameter 2.6 mm (Φ2.6 mm) was selected, the inner diameter of which was about 1.53 mm and the diameter of leads was 0.5 mm (Φ0.5 mm). A surge absorber was manufactured with the same method as that of Example 1, except that the shape of the tube core inside this surge absorber was the structure shown in FIG. 6, i.e., an integrated tube core formed by overlapping the tube cores shown in FIG. 3, the material of the conductive layer was monocrystalline silicon, and that of the non-conductive layer was glass. The surge absorber thus obtained was called tube 5.

The air chamber was filled with pure argon.

EXAMPLE 6

Glass diode envelope of external diameter 3.1 mm (Φ3.1 mm) was selected, the inner diameter of which was about 1.75 mm, and the diameter of the leads was 0.5 mm (Φ0.5 mm). A surge absorber was manufactured with the same method as that of Example 1, except that the shape of the tube core inside this surge absorber was the structure shown in FIG. 9, the material of the conductive layer was tungsten, and that of the non-conductive layer was glass. The surge absorber thus obtained was called tube 6.

The air chamber was filled with $SF_6$, and the purity thereof was 99%.

EXPERIMENT 1

In the following experiments, the surge absorbers obtained in the above-mentioned Example 1 to Example 6 (tube 1 to tube 6) were respectively tested with the method known to those skilled in the art. The test values selected were the technical parameters recorded in the following Table 1 and Table 2, such as working voltage, insulation resistance, electrostatic capacitance, surge life, and surge current capacity.

Their technical performances and results were listed in Table 1 and Table 2, respectively.

In these experiments, said current and voltage values were measured by a voltage-withstand apparatus made of a "variable DC fixed voltage fixed current power supply" (METRONIX, Model HSV2K-100, Power supplies 0–2 KV, 100 mA). Said resistance values were measured by a Component Tester (ADEX Corporation, Model 1-808-BTL).

TABLE 1

| | Working Voltage Vs(V) | Insulation Resistance (IR) Ω | Electrostatic Capacitance C (pF) | Surge life Test ESD: 500 pF–5000–10000 V times |
|---|---|---|---|---|
| Tube 1 | 80 | >100M/DC50 V | <0.6 | >300 |
| Tube 2 | 206 | >100M/DC100 V | <0.6 | >300 |
| Tube 3 | 315 | >100M/DC100 V | <0.6 | >300 |

TABLE 2

| | Working Voltage Vs(V) | Insulation Resistance Life IR Ω | Electrostatic Capacitance C (pF) | Surge Current Capacity (8 × 20) μsec | Surge Life Test DOC Cycle* |
|---|---|---|---|---|---|
| Tube 4 | 560 | >100M/DC250 V | <0.6 | 500 A | DOC 1 cycle |
| Tube 5 | 1000 | >100M/DC500 V | <1 | 2000 A | (8 × 20) μsec-100A 300 times |
| Tube 6 | 3668 | >100M/DC500 V | <1 | 2000 A | (8 × 20) μsec-100A 300 times |

Remarks:
*DOC cycle: (10 × 1000) μsec, (100 × 1000) μsec-1 KV 12 times, respectively.

EXPERIMENT 2

The stabilities of the surge absorbers of the present invention obtained in Examples 1–6 were tested with the means and method known to those skilled in the art, wherein the technical parameters employed were: working life, cold hardiness, heat-resistance, humidity-resistance, temperature adaptation. The results were shown in Table 3.

TABLE 3

| Item | Test Method | Result |
|---|---|---|
| Working Life | Charge the 1500 pF capacitor by applying 10KV DC voltage, contact discharge with a 2K resistor, 10 sec period, 200 times. | The measurements vary within ±30% before and after the test |
| Cold Hardiness | Placed in −40° C. for 1000 hr, then measured after being placed in room temperature for 2 hr. | Same values before and after test |
| Heat-resistance | Placed in 125° C. for 1000 hr, then measured after being placed in room temperature for 2 hr. | Same values before and after test |
| Humidity-resistance | Placed in 45° C. and relative humidity of 90–95% for 1000 hr, then measured after being placed in room temperature for 2 hr. | Same values before and after test |
| Temperature Adaptation | Repeating −40° C. (30 min) - - room temperature (2 min) - - 125° C. (30 min) for more than 10 times, then measured after being placed in room temperature for 2 hr. | Same values before and after test |

After having tested the six types of surge absorbers with the above-mentioned methods, all the variations of the working voltages, insulation resistances, electrostatic capacitances, surge lives and surge capacities of these surge absorbers as listed in Table 1 and Table 2 were within the prescribed values off the above Tables.

What is claimed is:

1. A surge absorber comprising a housing filled with an inert gas therein; a housing core mounted in said housing, said housing core including at least a layer of conductive material and a layer of a non-conductive material; and two electrodes respectively connected to each end of said housing core, wherein said conductive material is selected from the group consisting of monocrystalline silicon, hard metals or metallic alloys, and said non-conductive material is selected from the group consisting of ceramic, glass, or mixture of ceramic and glass, and wherein said non-conductive material layer is disposed on a top surface of the conductive material layer of a multiple stepped tower-like core and said non-conductive material layer has a thickness of more than 0.04 mm so as to maintain a distance between said conductive material layer and one of said electrodes.

2. A surge absorber as claimed in claim 1, wherein said housing core is an integrated body constituted by sequentially overlapping the conductive material and the non-conductive material.

3. A surge absorber as claimed in claim 1, wherein said housing core is an integrated body constituted by non-sequentially overlapping the conductive material and the non-conductive material.

4. A surge absorber as claimed in claim 1, wherein said housing core is of an irregular shape.

5. A surge absorber comprising a housing filled with an inert gas therein; a core mounted in said housing, said core including a plurality of layers of conductive material and non-conductive material alternatively disposed with one another and being in multiple stepped tower-like structure; and two electrodes respectively connected to each end of said core, wherein said conductive material is selected from the group consisting of monocrystalline silicon, hard metals or metal alloys, and said non-conductive material is selected from the group consisting of glass, or mixture of glass and ceramic, and wherein said non-conductive material layer are laminated sequentially on respective surface layers of the conductive material layers in order to maintain respectively a distance between said conductive material layers and a distance between one of the conductive material layers and one of said electrodes.

6. A surge absorber of claim 5, wherein said non-conductive material layers have respectively predetermined thickness of at least 0.04 mm to maintain the respective distances between the conductive layers, and one of said electrodes.

7. A surge absorber comprising a housing filled with an inert gas therein; a core including a plurality of layers of conductive material and non-conductive material arbitrarily overlapped with one another and being in a multiple stepped tower-like structure; and two electrodes respectively connected to each end of said core and mounted in said housing, wherein said conductive material is selected from the group consisting of monocrystalline silicon, hard metals or metal alloys, and said non-conductive material is selected from the group consisting of glass, or mixture of glass and ceramic, and wherein said non-conductive material layers are laminated non-sequentially on respective surfaces of the conductive material layers in order to maintain respectively a distance between said conductive material layers and a distance between one of said conductive material layers and one of said electrodes.

8. A surge absorber of claim 7, wherein said non-conductive material layers have respectively predetermined thickness of at least 0.04 mm to maintain the respective distances between the conductive layers, and one of said electrodes.

* * * * *

UNITED STATES PATENT AND TRADEMARK OFFICE
CERTIFICATE OF CORRECTION

PATENT NO. : 5,745,330
DATED : April 28, 1998
INVENTOR(S) : Binglin YANG

It is certified that error appears in the above—identified patent and that said Letters Patent is hereby corrected as shown below:

Title page, Section [30] Delete "[CH] Switzerland" and insert --[CN] China--.

Signed and Sealed this

Twenty-first Day of July, 1998

Attest:

Attesting Officer

BRUCE LEHMAN

*Commissioner of Patents and Trademarks*